Patented May 13, 1947

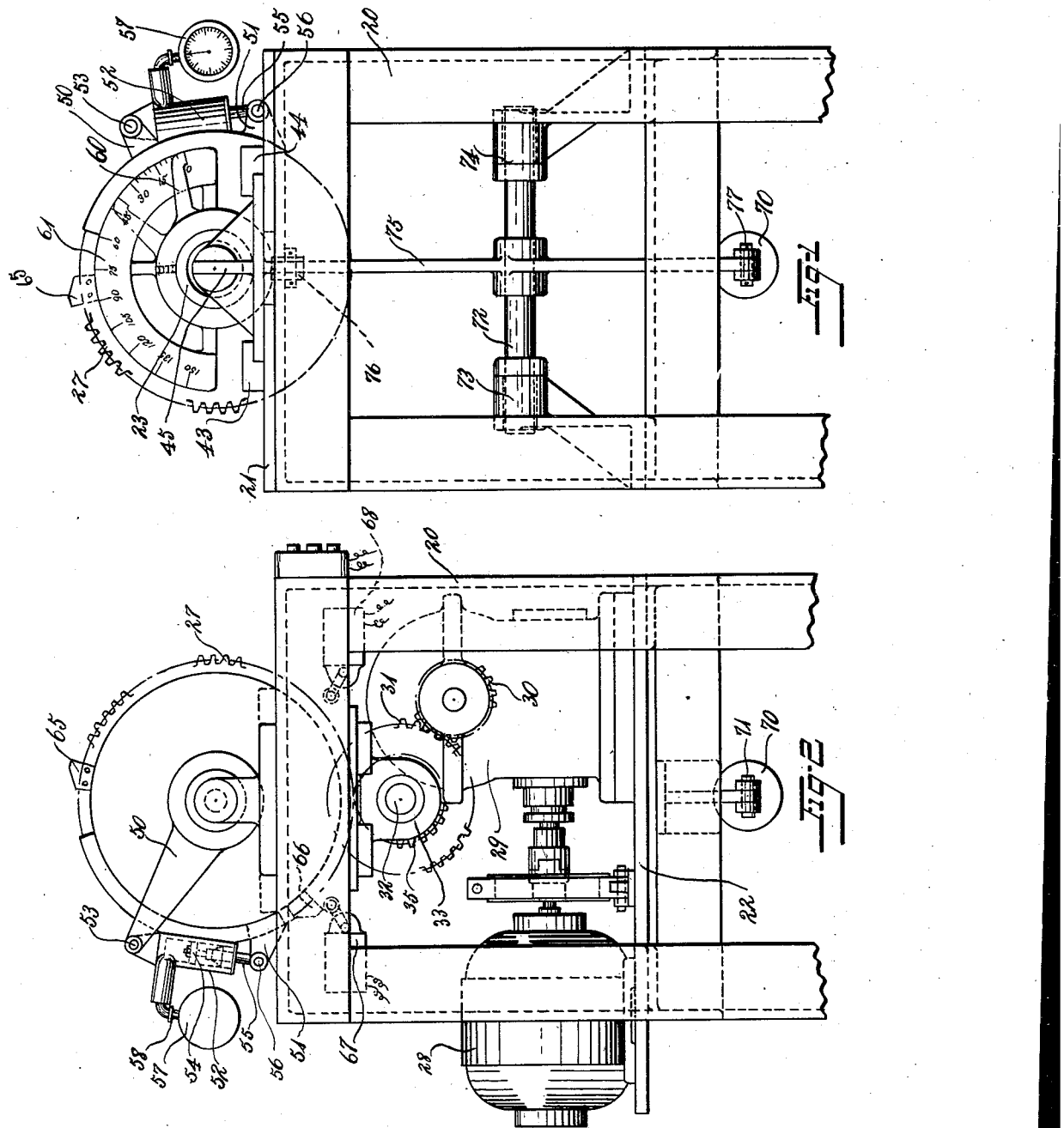

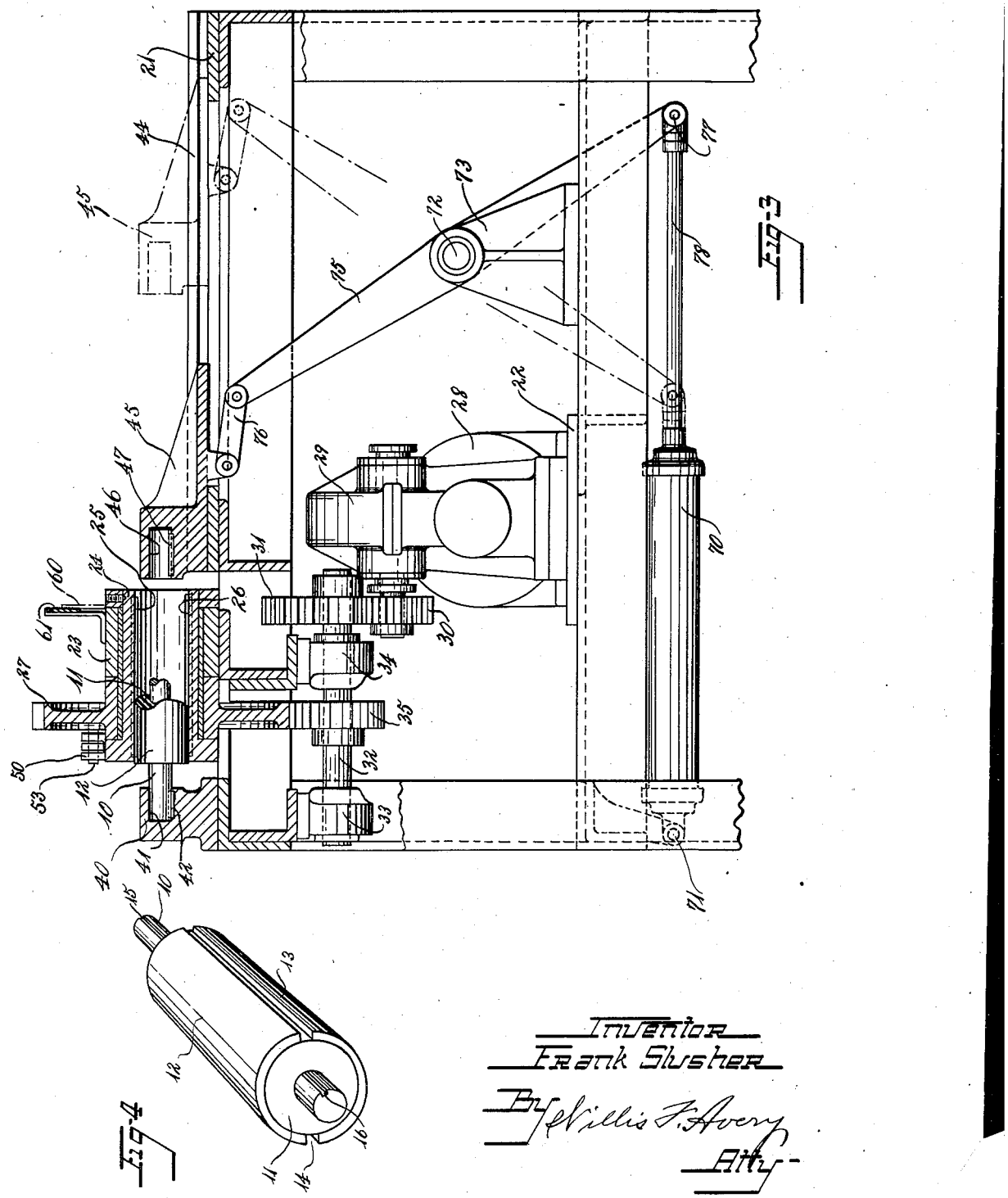

2,420,385

UNITED STATES PATENT OFFICE 2,420,385

TORSIONAL TESTING APPARATUS

Frank Slusher, Akron, Ohio, assignor to The B. F. Goodrich Company, New York, N. Y., a corporation of New York Application July 31, 1944, Serial No. 547,368

4 Claims. (Cl. 73—99)

This invention relates to apparatus for measuring the torque-deflection characteristics of an article, and is especially useful in determining the torque resistance of rubber torsion spring structures.

In the manufacture of torsion spring structures of rubber and metal, it has been found desirable to test individual structures, as the torque characteristics of the structures vary considerably, depending upon the rubber composition and the time of vulcanization.

Objects of the invention are to provide apparatus whereby the spring structure may be tested under actual loading conditions; to provide for direct indication of the torque load; to provide convenience in the loading and unloading of the apparatus, and to provide positive holding of the spring structure without slippage. These and other objects will appear from the following description and the accompanying drawings.

Of the drawings:

Fig. 1 is a front elevation of apparatus constructed in accordance with and embodying the invention, Fig. 2 is a rear elevation thereof, Fig. 3 is a side elevation of the same partly broken away and in section, and Fig. 4 is a perspective view of a spring structure in the testing of which the present invention is useful.

Referring to the drawings, and first to Fig. 4 thereof:

The illustrative spring structure comprises a metal shaft 10 having a cylindrical body 11 of soft vulcanized rubber or other rubber-like composition thereabout and enclosed by a shell or housing of metal formed of complementary arcuate plates or shell members 12, 13, spaced-apart at their axially extending margins as at 14. The rubber-like material is united as by a bond of vulcanization to the shaft and also to the shell members 12, 13. The shaft is longer than the body of rubber-like material and the shell members, and has keyways 15, 16 in its projecting ends. In use, the spring structure is forced within a housing to which the shell is secured, as by keys engaging between the shell sections, and the ends of the shaft 10 project beyond the housing where they may be engaged by sockets 41, 46 for holding the shaft against rotation while force is applied for stressing the body of rubber-like material torsionally.

Referring to Figs. 1 to 3 of the drawings, the testing apparatus comprises a frame 20 having a top plate 21 and a shelf 22 therebelow. Fixed to the top plate of the frame is a horizontal bearing 23 through which a quill 24 is rotatably mounted. The quill 24 is provided on its inner surface with keys 25, 26 and is adapted to receive the shell of the spring structure to be tested with its keys 25, 26 engaging between the arcuate shell members for securing the shell in non-rotatable relation to the quill. Rotatably mounted about the quill is the gear 27. A motor 28 and a geared speed reducer 29 are fixed to the shelf 22, and pinion 30 is fixed to the shaft of the speed reducer and meshes with a gear 31 fixed to a jack shaft 32. The jack shaft is rotatably mounted in bearings 33, 34 secured to the frame on the machine, and also has a pinion 35 fixed thereon which meshes with the gear 27. The arrangement is such that the motor 28 is adapted to rotate the gear 27 at a slow speed. For retaining the shaft 10 against rotation, a socket bearing 40 is fixed to the top 21 of the frame and is formed with a socket 41 adapted to receive one end of the shaft 10 and having a key 42 for engaging the keyway in that end of the shaft. The top 21 of the frame is provided with gibs 43, 44 parallel to the bore of the quill and adapted to retain the carriage 45 slidably arranged between the gibs. The carriage 45 is formed with a socket bearing 46 having a key 47 adapted to engage the end of the shaft 10. The arrangement is such that the spring structure to be tested may be inserted in the quill with the ends of the shaft 10 engaging in the sockets 41 and 46 and retained thereby against rotation while the quill with the outer shell of the spring structure may be rotated about the shaft to stress the body of rubber-like material.

For rotating the quill and simultaneously determining the torque load thereon, an arm 50 is fixed to the quill and extends radially thereof. A lug 51 is provided on the gear 27 in the same plane of rotation as the arm 50. A fluid confining capsule provided by a fluid cylinder 52 is pivotally mounted as at 53 on arm 50. A piston 54 within the cylinder 52 is fixed to a piston rod 55 which is pivotally secured as at 56 to the lug 51. A dial indicating pressure gauge 57 is connected by a pipe 58 to the cylinder 52 and is mounted thereon. The cylinder is filled with a substantially non-compressible liquid such as oil. The arrangement is such that rotation of the gear 27 advances the arm 50 through the cylinder 52 and the liquid in the cylinder 52 through which the torque load is transmitted is placed under pressure which is directly indicated on the dial of the pressure gauge in sight of the operator. The quill 24 is provided with a finger or pointer 60 secured thereto. An arcuate scale 61 is fixed to the frame of the machine adjacent the pointer and is graduated to indicate to the operator the angle of rotation of the quill under the load indicated by the pressure gauge.

The electric motor 28 which drives the gear 27 is adapted to rotate in either direction and the current to the motor is controlled by an arrangement of push buttons located conveniently for use by the operator. Mounted on the gear 27 is a pair of stops 65, 66. The limit switch 67 is mounted on the frame 20 in a position to be actuated by the stop 66 when the gear 27 is rotated in one direction. A similar switch 68 is also mounted on the frame in a position to be actuated by the stop 65 when the gear 27 is rotated in the opposite direction. The electrical circuit is so arranged that when the starting button is held down the motor 28 is energized and rotates the gear 27 in a counterclockwise direction as seen in Fig. 1 until the button is released or the stop 65 opens the switch 68 by contact therewith. In either event the motor is reversed and the gear 27 rotates in a clockwise direction to an angular position where the stop 66 opens the switch 67 by contact therewith and deenergizes the motor. By this arrangement the angular deflection of the spring to be tested is effectively limited by the stops 65 and 66, preventing injury to the spring should the operator continue to hold down the starting button.

For actuating the carriage 45, a double acting fluid pressure operated cylinder 70 is pivotally mounted as at 71 to the frame of the machine. A horizontal shaft 72 is rotatably mounted in bearings 73, 74 fixed to the machine frame. A lever 75 is fixed to shaft 72. The upper end of the lever 75 is pivotally connected to the carriage by a link 76 and the lower end of the arm is pivotally connected as at 77 to the piston rod 78 of the cylinder 70. Fluid pressure from a convenient source not shown is connected to the opposite ends of the cylinder 70 through a reversing valve, not shown. The arrangement is such that the carriage is moved forward and back by power at the will of the operator and may be used to force the spring structure to be tested into the quill 24.

The operation of the apparatus is as follows: One end of the shaft of the spring structure is entered in the socket bearing of the carriage 45, the cylinder 70 is energized by fluid pressure to advance the carriage 45 toward the quill 24, whereby the shell of the spring structure is forced into the quill and the opposite end of the shaft of the structure is forced into the socket bearing 40. Thereafter the operator depresses the push button energizing the motor 28, and the quill with the outer shell structure of the spring sructure is rotated about the shaft. The operator observes the angular displacement of the spring structure by observing the position of the pointer on the scale 61 and at the same time observes the torque load corresponding to such deflection by observing the dial of the gauge 57. Upon determining these readings the starting button is released, reversing the motor, and the spring structure is restored to its normal state while the motor 28 continues to operate until deenergized by stop 66 engaging switch 67. The cylinder 70 is then energized to force the piston rod 78 in the opposite direction, thereby permitting removal of the spring structure from the quill 24, and the test is complete.

Variations may be made without departing from the scope of the invention as it is defined by the following claims.

I claim:

1. Apparatus for testing the torsional characteristics of a torsion spring structure having a shaft, an outer shell thereabout, and a resilient body of vulcanized rubber-like material therebetween and bonded thereto, said apparatus comprising holding means engaging opposite ends of the shaft to hold it against rotation, means for moving one of said holding means toward and from the other for mounting a spring structure therebetween, moveable means engaging the outer shell, power-driven means for applying a torsional load to said structure through said moveable means, and indicating means responsive to movement of said moveable means relative to said power driven means.

2. Apparatus for testing the torsional characteristics of a torsion spring structure having spaced-apart elements and a distortable body therebetween, said apparatus comprising a pair of holding means for holding one element of the spring structure, means for moving one of said holding means toward and from the other for placing a spring structure therebetween, moveable means engageable with the other element of the spring structure, power-driven means for applying a torsional load to said structure through said moveable means, means connected with said moveable means for indicating the torsional load, and additional means for indicating the amount of torsional deflection of said structure under such load relative to said power-driven means.

3. Apparatus for testing the torsional characteristics of a torsion spring structure having a shaft, an outer shell thereabout, and a resilient body of vulcanized rubber-like material therebetween and bonded thereto, said apparatus comprising a socket member and a second socket member moveable relative to the first, means for moving the moveable socket member toward and from the first socket member to chuck the spring structure and restrain the shaft against rotation, a rotatable sleeve mounted between said socket members for engaging the outer shell of the spring structure to rotate the same, means for applying a rotative movement to said sleeve to deflect the spring structure torsionally, and means connected with the last-named means and said sleeve for measuring the torsional load applied to the spring structure.

4. Apparatus for testing the torsional characteristics of a torsion spring structure having a shaft, an outer shell thereabout, and a resilient body of vulcanized rubber-like material therebetween and bonded thereto, said apparatus comprising a socket member and a second socket member moveable relative to the first, means for moving the moveable socket member toward and from the first socket member to chuck the spring structure and restrain the shaft against rotation, a rotatable sleeve mounted between said socket members for engaging the outer shell of the spring structure to rotate the same, means for applying a rotative movement to said sleeve to deflect the spring structure torsionally, and means connected with the last-named means and said sleeve for measuring the torsional load applied to the spring structure, the measuring means comprising a fluid-confining container and means connected therewith for indicating the pressure of the fluid therein.

FRANK SLUSHER.

(Other references on following page)

REFERENCES CITED

The following references are of record in the file of this patent:

UNITED STATES PATENTS

| Number | Name | Date |
|---|---|---|
| 2,030,464 | Nilson | Feb. 11, 1936 |
| 1,810,085 | Rettig et al. | June 16, 1931 |
| 2,063,622 | Pfeiffer | Dec. 8, 1936 |
| 1,308,410 | Girl | July 1, 1919 |

FOREIGN PATENTS

| Number | Country | Date |
|---|---|---|
| 314,925 | Germany | Oct. 18, 1919 |
| 537,650 | Germany | Nov. 5, 1931 |